United States Patent
Mukherjee

(10) Patent No.: US 12,160,360 B2
(45) Date of Patent: Dec. 3, 2024

(54) SYSTEM FOR PACKET CLUSTER ROUTING USING QUANTUM OPTIMIZATION WITHIN A DISTRIBUTED NETWORK

(71) Applicant: BANK OF AMERICA CORPORATION, Charlotte, NC (US)

(72) Inventor: Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 360 days.

(21) Appl. No.: 17/672,865

(22) Filed: Feb. 16, 2022

(65) Prior Publication Data

US 2023/0261968 A1    Aug. 17, 2023

(51) Int. Cl.
*H04L 45/12* (2022.01)
*G06N 10/60* (2022.01)
*H04L 45/00* (2022.01)
*H04L 45/44* (2022.01)

(52) U.S. Cl.
CPC ........... *H04L 45/124* (2013.01); *G06N 10/60* (2022.01); *H04L 45/44* (2013.01); *H04L 45/46* (2013.01)

(58) Field of Classification Search
CPC ....... H04L 45/124; H04L 45/44; H04L 45/46; G06N 10/60
See application file for complete search history.

(56) References Cited

U.S. PATENT DOCUMENTS

| | | | |
|---|---|---|---|
| 7,113,967 B2 | 9/2006 | Cleve et al. | |
| 7,135,701 B2 | 11/2006 | Amin et al. | |
| 7,234,144 B2 | 6/2007 | Wilt et al. | |
| 7,619,437 B2 | 11/2009 | Thom et al. | |
| 7,639,035 B2 | 12/2009 | Berkley | |
| 7,660,533 B1 | 2/2010 | Meyers et al. | |
| 7,898,282 B2 | 3/2011 | Harris et al. | |
| 2003/0005068 A1 | 1/2003 | Nickel et al. | |
| 2003/0121028 A1 | 6/2003 | Coury et al. | |
| 2003/0204623 A1* | 10/2003 | Cain | H04L 45/04 709/241 |
| 2004/0267916 A1 | 12/2004 | Chambliss et al. | |
| 2005/0273306 A1 | 12/2005 | Hilton et al. | |
| 2006/0221978 A1 | 10/2006 | Venkatachalam | |
| 2006/0225165 A1 | 10/2006 | Maassen van den Brink et al. | |
| 2007/0180586 A1 | 8/2007 | Amin | |

(Continued)

FOREIGN PATENT DOCUMENTS

| | | | | |
|---|---|---|---|---|
| EP | 1890438 A1 * | 2/2008 | ............. | H04L 45/04 |
| EP | 3745777 A1 * | 12/2020 | ........... | H04L 45/124 |

*Primary Examiner* — Sudesh M Patidar
(74) *Attorney, Agent, or Firm* — Moore & Van Allen PLLC; Anup Shrinivasan Iyer

(57) ABSTRACT

Systems, computer program products, and methods are described herein for packet cluster routing using quantum optimization within a distributed network. An example system receives data packets from a source to be transmitted to a target via a cluster of nodes in the distributed network. The example system retrieves information associated with each node in the cluster of nodes. The example system uses a quantum optimization engine to determine an optimal data path from an ingress node to an egress node in the cluster of nodes based on at least the information associated with each node. Upon determining the optimal data path, the example system routes the data packets from the source, via the optimal data path, to the target.

17 Claims, 2 Drawing Sheets

(56) References Cited

U.S. PATENT DOCUMENTS

| | | |
|---|---|---|
| 2007/0239366 A1 | 10/2007 | Hilton et al. |
| 2008/0186918 A1 | 8/2008 | Tinnakornsrisuphap et al. |
| 2008/0215850 A1 | 9/2008 | Berkley et al. |
| 2008/0218519 A1 | 9/2008 | Coury et al. |
| 2008/0262990 A1 | 10/2008 | Kapoor et al. |
| 2008/0313430 A1 | 12/2008 | Bunyk |
| 2009/0070402 A1 | 3/2009 | Rose et al. |
| 2009/0078932 A1 | 3/2009 | Amin |
| 2009/0164435 A1 | 6/2009 | Routt |
| 2009/0325694 A1 | 12/2009 | Beckman et al. |
| 2010/0261481 A1 | 10/2010 | Resende et al. |
| 2016/0080202 A1* | 3/2016 | Zhang ................ H04L 41/0813 709/223 |
| 2017/0193462 A1* | 7/2017 | Bruckner ............... G06Q 30/06 |
| 2020/0244728 A1* | 7/2020 | Jha ........................... H04L 9/30 |
| 2021/0006412 A1* | 1/2021 | Gahlinger ............. H04L 63/145 |
| 2021/0312107 A1* | 10/2021 | Koutsomanis ........ G06F 9/5027 |
| 2022/0141099 A1* | 5/2022 | Prasanna Kumar .. H04W 24/02 709/224 |
| 2022/0225171 A1* | 7/2022 | Thubert ................. H04L 45/24 |
| 2023/0177415 A1* | 6/2023 | Kumar ................... G06N 10/60 |

* cited by examiner

SYSTEM FOR PACKET CLUSTER ROUTING USING QUANTUM OPTIMIZATION WITHIN A DISTRIBUTED NETWORK

FIELD OF THE INVENTION

The present invention embraces a system for packet cluster routing using quantum optimization within a distributed network.

BACKGROUND

In most packet-switching networks, each node is provided with the ability to make its own decision locally, as to which packets are forwarded and which ones are dropped based on its buffer capacity and use. However, there is a lack of global perspective when such decisions are allowed to be made at the node-level. Therefore, there is a need for a system for packet cluster routing using quantum optimization within a distributed network.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for packet cluster routing using quantum optimization within a distributed network is presented. The system comprising: at least one non-transitory storage device; and at least one processor coupled to the at least one non-transitory storage device, wherein the at least one processor is configured to: electronically receive one or more data packets from a source, wherein the one or more data packets are to be transmitted to a target via a cluster of nodes in the distributed network; retrieve information associated with each node in the cluster of nodes; deploy a quantum optimization engine on the cluster of nodes, wherein the cluster of nodes comprises an ingress node and an egress node; determine, using the quantum optimization engine, an optimal data path from the ingress node to the egress node in the cluster of nodes based on at least the information associated with each node; and transmit control signals configured to route the one or more data packets from the source, via the optimal data path, to the target.

In some embodiments, the information associated with each node comprises at least a memory size and usage, response time, average latency, error rate, requests per second, and throughput.

In some embodiments, the at least one processor is further configured to: continuously monitor each node in the cluster of nodes for a predetermined period of time; and retrieve information associated with each node in the cluster of nodes based on at least continuously monitoring each node.

In some embodiments, the ingress node is a primary node to receive the one or more data packets into the cluster of nodes.

In some embodiments, the egress node is a primary node to transmit the one or more data packets out of the cluster of nodes.

In some embodiments, the at least one processor is further configured to: determine that routing of the one or more data packets from the source to the target requires transmission through a first cluster of nodes and a second cluster of nodes; deploy a first quantum optimization engine on the first cluster of nodes and a second quantum optimization engine on the second cluster of nodes, wherein the first cluster of nodes is associated with a first ingress node and a first egress node, wherein the second cluster of nodes is associated with a second ingress node and a second egress node; determine, using the first quantum optimization engine, a first optimal data path from the first ingress node to the first egress node of the first cluster of nodes; determine, using the second quantum optimization engine, a second optimal data path from the second ingress node to the second egress node of the second cluster of nodes; and transmit controls signals configured to route the one or more data packets from the source, via the first optimal path and the second optimal path, to the target.

In some embodiments, routing the one or more data packets further comprises: retrieve information associated with each node in the first cluster of nodes; determine the first optimal data path in the first cluster of nodes based on at least the information associated with each node in the first cluster of nodes; retrieve information associated with each node in the second cluster of nodes; and determine the second optimal path in the second cluster of nodes based on at least the information associated with each node in the first cluster of nodes and the information associated with each node in the second cluster of nodes.

In another aspect, a computer program product for packet cluster routing using quantum optimization within a distributed network is presented. The computer program product comprising a non-transitory computer-readable medium comprising code causing a first apparatus to: electronically receive one or more data packets from a source, wherein the one or more data packets are to be transmitted to a target via a cluster of nodes in the distributed network; retrieve information associated with each node in the cluster of nodes; deploy a quantum optimization engine on the cluster of nodes, wherein the cluster of nodes comprises an ingress node and an egress node; determine, using the quantum optimization engine, an optimal data path from the ingress node to the egress node in the cluster of nodes based on at least the information associated with each node; and transmit control signals configured to route the one or more data packets from the source, via the optimal data path, to the target.

In yet another aspect, a method for packet cluster routing using quantum optimization within a distributed network is presented. The method comprising: electronically receiving one or more data packets from a source, wherein the one or more data packets are to be transmitted to a target via a cluster of nodes in the distributed network; retrieving information associated with each node in the cluster of nodes; deploying a quantum optimization engine on the cluster of nodes, wherein the cluster of nodes comprises an ingress node and an egress node; determining, using the quantum optimization engine, an optimal data path from the ingress node to the egress node in the cluster of nodes based on at least the information associated with each node; and transmitting control signals configured to route the one or more data packets from the source, via the optimal data path, to the target.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
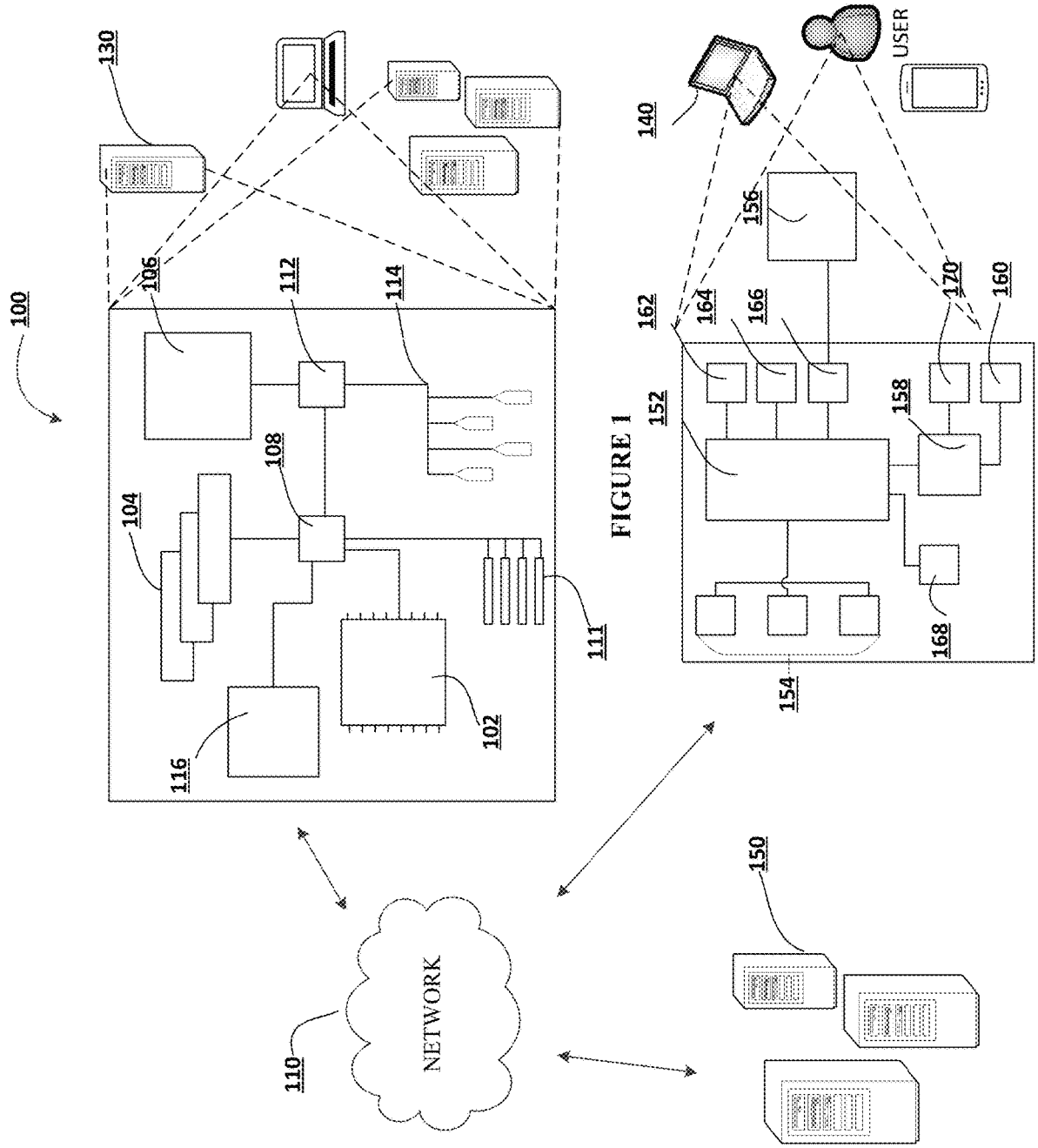
Figure 2:
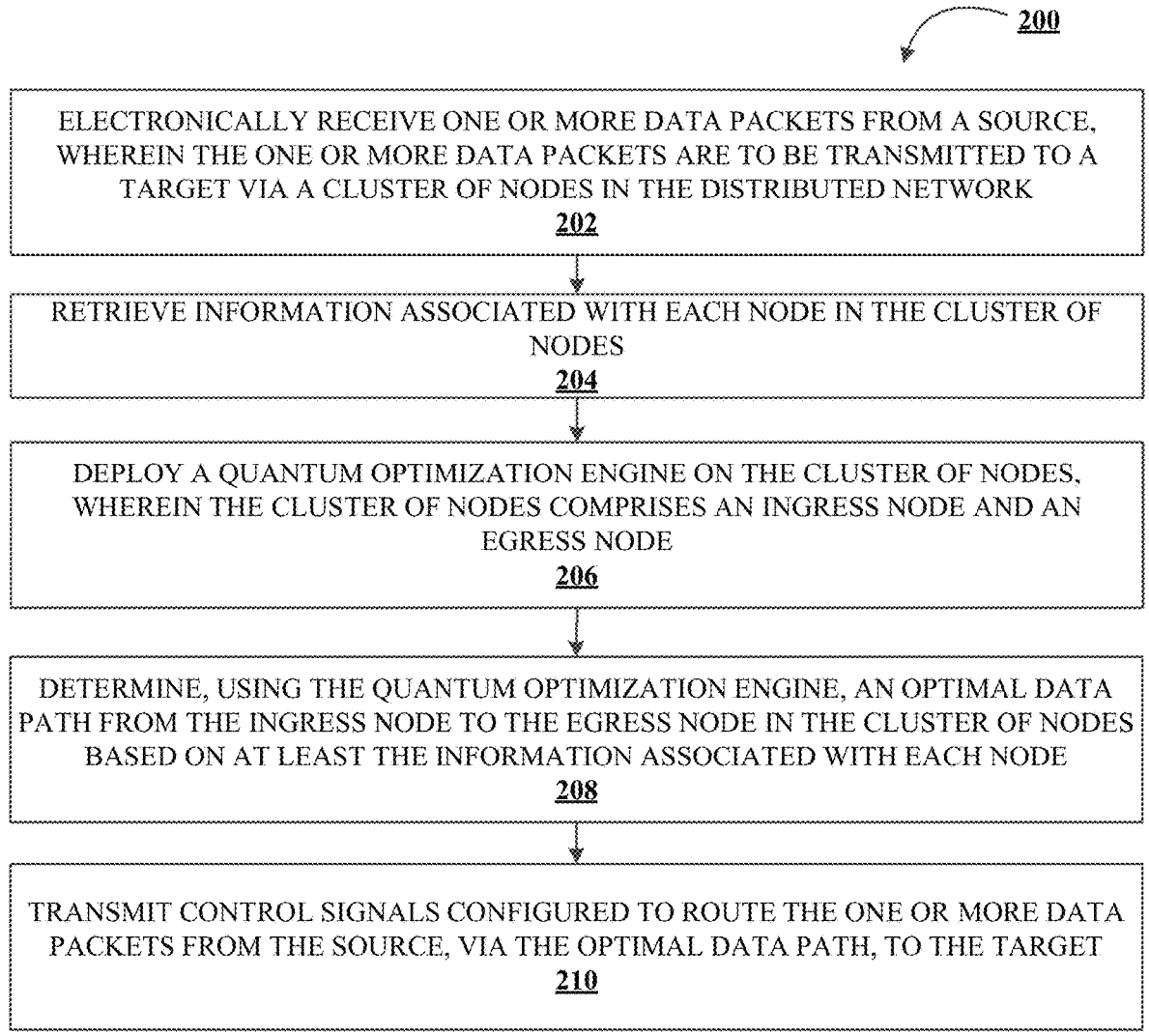

Having thus described embodiments of the invention in general terms, reference will now be made the accompanying drawings, wherein:

FIG. 1 illustrates technical components of a system for packet cluster routing using quantum optimization within a distributed network, in accordance with an embodiment of the invention;

FIG. 2 illustrates a process flow for packet cluster routing using quantum optimization within a distributed network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "quantum computer" is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously. A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously. In a quantum computer with n qubits, the quantum computer can be in a superposition of up to $2n$ states simultaneously. By comparison, a classical computer can only be in one of the $2n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Data packets are basic units of communication over a digital network. A data packet may also be referred to as a datagram, a segment, a block, a cell or a frame, depending on the protocol used for the transmission of data. When data has to be transmitted, it is typically broken down into similar structures of data before transmission, called data packets, which are reassembled to the original data chunk once they reach their destination. When one or more of these packets is interrupted in its journey, this is known as packet loss. Packet loss may occur due to a number of reasons, such as network hardware issues, software bugs, capacity overload, or the like, but most often packet loss occurs due to network congestion. Transmission protocols, such as Internet Protocol (IP), allows for routers to simply drop packets if a node or a network segment is too busy to deliver the data in the timely fashion. Typically, network nodes often devote a significant amount of storage space (buffers) for data packets while they wait to verify that the next node has properly received them. During peak network traffic, these buffers may be overloaded, causing dropped packets. With increasing number of users consuming streaming services these days, often these data packets are time-sensitive, and dropped packets cause disruption in service or loss in quality of the service are major issues. In most packet-switching networks, each node is provided with the ability to make its own decision locally, as to which packets are forwarded and which ones are dropped based on its buffer capacity and use. However, there is a lack of global perspective when such decisions are allowed to be made at the node-level. Therefore, there is a need for a system for packet cluster routing using quantum optimization within a distributed network.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207, 672, each of which is incorporated herein by reference in its entirety.

FIG. 1 illustrates technical components of a system for packet cluster routing using quantum optimization within a distributed network 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, a quantum computing system 150, and a user input device 140. In some embodiments, the system 130, the quantum computing system 150, and the user input device 140 may be used to implement the processes described herein, in accordance with an embodiment of the present invention. In this regard, the system 130, the quantum computing system 150, and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 as part of an application that may perform the functions disclosed herein, display graphical information for a GUI on an external input/output device, such as display 116 coupled to a high-speed interface 108, and/or the like. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140 and the quantum computing system 150. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a quantum computing system 150 that can be used in parallel with the system 130 to solve optimization problems presented, in accordance with an embodiment of the invention. While the system 130 is configured to perform classical digital processing tasks described herein, the quantum computing system 150 is configured to perform quantum processing tasks. In some embodiments, the quantum computing system 150 may include a data extraction subsystem, a quantum computing subsystem, and an action subsystem. As used herein, the term "subsystem" generally refers to components, modules, hardware, software, communication links, and the like of particular components of the system. Subsystems as contemplated in embodiments of the present invention are configured to perform tasks within the system as a whole.

In some embodiments, the data extraction subsystem may be configured to communicate with the system 130 via the network 110. It will be understood that any method of communication between the data extraction subsystem and the network is adequate, including but not limited to wired communication, Radiofrequency (RF) communication, Bluetooth WiFi, and the like. The data extraction subsystem then formats the data for optimization in the quantum computing subsystem.

In some embodiments, the quantum computing subsystem may include a quantum computing infrastructure, a quantum memory, and a quantum processor. The quantum computing infrastructure may include physical components for housing the quantum processor and the quantum memory. The quantum computer infrastructure further comprises a cryogenic refrigeration system to keep the quantum computing subsystem 154 at the desired operating levels. In general, the quantum processor is designed to perform adiabatic quantum computation and/or quantum annealing to optimize data received from the data extraction subsystem. The quantum memory is comprised of a plurality of qubits used for storing data during operation of the quantum computing subsystem. It will be understood that the quantum memory may be comprised of any such two-state quantum mechanical system, such as the polarization of a single photon, the spin of an electron, and the like.

In some embodiments, the action subsystem may communicate the optimized data from the quantum computing subsystem back to the system 130 via the network 110. It will be understood that any method of communication between the action subsystem and the network is adequate, including but not limited to wired communication, Radiofrequency (RF) communication, Bluetooth WiFi, and the like.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154, which in one embodiment includes the instructions of an application that may perform the functions disclosed herein. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130, the quantum computing system 150, and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140, the quantum computing system 150 (or any other computing devices) may provide the system 130 with permissioned to access the protected resources of the user input device 140, the quantum computing system 150 (or any other computing devices), which may include a GPS device, an image capturing component (e.g., camera), a microphone, a speaker, and/or any of the components described herein.

The user input device 140 may communicate with the system 130, the quantum computing system 150 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation— and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130, the quantum computing system 150, and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with embodiments of the invention, the components of the system environment 100, such as the system 130, the quantum computing system 150, and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

FIG. 2 illustrates a process flow for packet cluster routing using quantum optimization within a distributed network 200, in accordance with an embodiment of the invention. As shown in block 202, the process flow includes electronically receiving one or more data packets from a source, wherein the one or more data packets are to be transmitted to a target via a cluster of nodes in the distributed network. In a distributed network, a node may refer to a redistribution point or a communication endpoint. In some embodiments, a node may be any electronic device (e.g., user input device 140) that is operatively coupled to a network (e.g., network 110), and is capable of creating, receiving, or transmitting information over a communication channel. For example, a node may be a data communication equipment such as a modem, hub, bridge, or switch, or data terminal equipment such as a communication device, a printer, or a host computer. More often than not, a node may operate as part of a cluster, where all the nodes within a cluster communicate with each other through a shared network to perform operations. In other words, a cluster may be defined as a collection of multiple nodes, where each node is an independent machine. In some embodiments, a source may refer to an independent device from which the data (or data packets) originate (e.g., user input device), while a target may refer to an independent device that is a destination for the data (or data packets). Typically, data transmission occurs from a source to a target via one or more clusters of nodes.

Next, as shown in block 204, the process flow includes retrieving information associated with each node in the cluster of nodes. As described herein, in most packet-switching networks, each node is provided with the ability to make its own decision locally, as to which packets are forwarded and which ones are dropped based on its node configuration at the time. Node configuration provides a snapshot of the information associated with a node at a particular time instant. In some embodiments, the system may be configured to continuously monitor each node in the cluster of nodes for a predetermined period of time and have the capability to capture a snapshot of the node, i.e., retrieve information associated with the node, at any time instant. In some embodiments, the information associated with each node may include a memory size and usage, response time, average latency, error rate, requests per second, throughput, and/or the like.

Next, as shown in block 206, the process flow includes deploying a quantum optimization engine on the cluster of nodes, wherein the cluster of nodes comprises an ingress node and an egress node. In some embodiments, an ingress node may be the primary node to receive the data packets from an external node (e.g., source) into the cluster of nodes, while an egress node may be the primary node to transmit the data packets to an external node (e.g., target) out of the cluster of nodes.

In some embodiments, the quantum optimization engine may be core elements of an application, or part of an application that serves as a foundation for a larger piece of software and drives the functionality of the software in the quantum computing system. In accordance with the present systems and methods, a quantum computing system may be adapted for integration into the system. The quantum computing system may be configured for continuous operation, or it may be configured to be called upon/activated only when necessary to solve a specific problem (e.g., an optimization problem) that the quantum computing system is particularly well-suited to solve. The quantum computing system may, for example, be configured as a disposable, single-shot system (i.e., a system having a short lifespan or active time) for performing a single or small number of computations (if identified as necessary by the system) that govern a behavior of the system. Configuring the quantum computing system as a disposable, single-shot system has the advantage of relaxing a number of design specifications that are otherwise necessary to provide the continuous, long-term operation typically expected in the known quantum computing arts. In accordance with the present systems and methods, the quantum computing system may be configured to receive data from the system and perform a quantum computing operation (e.g., using the quantum optimization engine) in real-time.

Next, as shown in block 208, the process flow includes determining, using the quantum optimization engine, an optimal data path from the ingress node to the egress node in the cluster of nodes based on at least the information associated with each node. In some embodiments, the quantum optimization engine may be configured to implement quantum optimization algorithms to determine an optimal path from the ingress node to the egress node in the cluster of nodes. Optimization is the process of finding the best solution to a problem from a set of possible options, given its desired outcome and constraints. Here, the optimization problem is formulated as a minimization problem, where the optimal path is chosen by minimizing data packet loss (drops) across each node from the ingress node to the egress node.

Next, as shown in block 210, the process flow includes transmitting control signals configured to route the one or more data packets from the source, via the optimal data path, to the target. In some embodiments, the optimal path between the ingress node and the egress node may change based on a multitude of factors, including but not limited to, node configurations, network traffic, node addition and removal from the cluster, network topology change, data type associated with the data being transmitted, and/or the like. Therefore, the optimal path determined in a first time instant for a specific set of data packets may not be the same optimal path in a second time instant for subsequent set of data packets. In this way, the system may be configured to continuously monitor the nodes, deploy the quantum optimization engine, and determine optimal data paths in real-time.

In some embodiments, the routing of the data packets from the source to the target may require transmission through multiple clusters of nodes. Each cluster of nodes may have an ingress node and an egress node. In such cases, the system may be configured to deploy a quantum optimization engine on each cluster of nodes to determine an optimal path for the data packets to traverse through the cluster. To this end, the system may be configured to retrieve information associated with each node in each cluster, and determine the optimal path based on that information. In other words, the system may be configured to determine that routing of the one or more data packets from the source to the target requires transmission through a first cluster of nodes and a second cluster of nodes. In response, the system may be configured to deploy a first quantum optimization engine on the first cluster of nodes and a second quantum optimization engine on the second cluster of nodes. Here, the first cluster of nodes is associated with a first ingress node and a first egress node, and the second cluster of nodes is associated with a second ingress node and a second egress node. Then, the system may be configured to determine, using the first quantum optimization engine, a first optimal data path from the first ingress node to the first egress node of the first cluster of nodes. Similarly, the system may be configured to determine, using the second quantum optimization engine, a second optimal data path from the second ingress node to the second egress node of the second cluster of nodes. To achieve this, the system may be configured to retrieve information associated with each node in the first cluster of nodes, and determine the first optimal data path in the first cluster of nodes based on at least the information associated with each node in the first cluster of nodes. Similarly, the system may be configured to retrieve information associated with each node in the second cluster of nodes, and determine the second optimal path in the second cluster of nodes based on at least the information associated with each node in the first cluster of nodes and the information associated with each node in the second cluster of nodes. In response, the system may be configured to transmit controls signals configured to route the one or more data packets from the source, via the first optimal path and the second optimal path, to the target.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for packet cluster routing using quantum optimization within a distributed network, the system comprising:
   a processor;
   a non-transitory storage device containing instructions that, when executed by the processor, cause the processor to:
   electronically receive data packets from a source, wherein the data packets are to be transmitted to a target via a cluster of nodes in the distributed network;
   retrieve information associated with each node in the cluster of nodes, wherein the information associated with each node comprises at least a memory size and usage, response time, average latency, error rate, requests per second, and throughput;
   determine, using a quantum optimization engine, an optimal data path from an ingress node to an egress node in the cluster of nodes by minimizing data packet loss at each node in the cluster of nodes, wherein the optimal path is determined based on at least the information associated with each node, wherein the ingress node and the egress node are associated with the cluster of nodes; and
   transmit control signals configured to route the data packets from the source, via the optimal data path, to the target.

2. The system of claim 1, wherein the instructions, when executed, cause the processor to:
   continuously monitor each node in the cluster of nodes for a predetermined period of time; and
   retrieve information associated with each node in the cluster of nodes based on at least continuously monitoring each node.

3. The system of claim 1, wherein the ingress node is a primary node to receive the data packets into the cluster of nodes.

4. The system of claim 1, wherein the egress node is a primary node to transmit the data packets out of the cluster of nodes.

5. The system of claim 1, wherein the instructions, when executed, cause the processor:
   determine that routing of the data packets from the source to the target requires transmission through a first cluster of nodes and a second cluster of nodes;
   deploy a first quantum optimization engine on the first cluster of nodes and a second quantum optimization engine on the second cluster of nodes, wherein the first cluster of nodes is associated with a first ingress node and a first egress node, wherein the second cluster of nodes is associated with a second ingress node and a second egress node;
   determine, using the first quantum optimization engine, a first optimal data path from the first ingress node to the first egress node of the first cluster of nodes;
   determine, using the second quantum optimization engine, a second optimal data path from the second ingress node to the second egress node of the second cluster of nodes; and
   transmit controls signals configured to route the data packets from the source, via the first optimal path and the second optimal path, to the target.

6. The system of claim 5, wherein routing the data packets further comprises:
   retrieve information associated with each node in the first cluster of nodes;
   determine the first optimal data path in the first cluster of nodes based on at least the information associated with each node in the first cluster of nodes;
   retrieve information associated with each node in the second cluster of nodes; and
   determine the second optimal path in the second cluster of nodes based on at least the information associated with each node in the first cluster of nodes and the information associated with each node in the second cluster of nodes.

7. A computer program product for packet cluster routing using quantum optimization within a distributed network, the computer program product comprising a non-transitory computer-readable medium comprising code when executed by a processor, causes the processor to:
   electronically receive data packets from a source, wherein the data packets are to be transmitted to a target via a cluster of nodes in the distributed network;
   retrieve information associated with each node in the cluster of nodes, wherein the information associated with each node comprises at least a memory size and usage, response time, average latency, error rate, requests per second, and throughput;
   determine, using a quantum optimization engine, an optimal data path from an ingress node to an egress node in the cluster of nodes by minimizing data packet loss at each node in the cluster of nodes, wherein the optimal path is determined based on at least the information associated with each node, wherein the ingress node and the egress node are associated with the cluster of nodes; and
   transmit control signals configured to route the data packets from the source, via the optimal data path, to the target.

8. The computer program product of claim 7, wherein the code further causes the processor to:
   continuously monitor each node in the cluster of nodes for a predetermined period of time; and
   retrieve information associated with each node in the cluster of nodes based on at least continuously monitoring each node.

9. The computer program product of claim 7, wherein the ingress node is a primary node to receive the data packets into the cluster of nodes.

10. The computer program product of claim 7, wherein the egress node is a primary node to transmit the data packets out of the cluster of nodes.

11. The computer program product of claim 10, wherein the code further causes the processor to:
   determine that routing of the data packets from the source to the target requires transmission through a first cluster of nodes and a second cluster of nodes;

deploy a first quantum optimization engine on the first cluster of nodes and a second quantum optimization engine on the second cluster of nodes, wherein the first cluster of nodes is associated with a first ingress node and a first egress node, wherein the second cluster of nodes is associated with a second ingress node and a second egress node;

determine, using the first quantum optimization engine, a first optimal data path from the first ingress node to the first egress node of the first cluster of nodes;

determine, using the second quantum optimization engine, a second optimal data path from the second ingress node to the second egress node of the second cluster of nodes; and transmit controls signals configured to route the data packets from the source, via the first optimal path and the second optimal path, to the target.

12. The computer program product of claim 11, wherein routing the data packets further comprises:

retrieve information associated with each node in the first cluster of nodes;

determine the first optimal data path in the first cluster of nodes based on at least the information associated with each node in the first cluster of nodes;

retrieve information associated with each node in the second cluster of nodes; and determine the second optimal path in the second cluster of nodes based on at least the information associated with each node in the first cluster of nodes and the information associated with each node in the second cluster of nodes.

13. A method for packet cluster routing using quantum optimization within a distributed network, the method comprising:

electronically receiving data packets from a source, wherein the data packets are to be transmitted to a target via a cluster of nodes in the distributed network;

retrieving information associated with each node in the cluster of nodes, wherein the information associated with each node comprises at least a memory size and usage, response time, average latency, error rate, requests per second, and throughput;

determining, using a quantum optimization engine, an optimal data path from an ingress node to an egress node in the cluster of nodes by minimizing data packet loss at each node in the cluster of nodes, wherein the optimal path is determined based on at least the information associated with each node, wherein the ingress node and the egress node are associated with the cluster of nodes; and transmitting control signals configured to route the data packets from the source, via the optimal data path, to the target.

14. The method of claim 13, wherein the method further comprises:

continuously monitoring each node in the cluster of nodes for a predetermined period of time; and retrieving information associated with each node in the cluster of nodes based on at least continuously monitoring each node.

15. The method of claim 13, wherein the ingress node is a primary node to receive the data packets into the cluster of nodes.

16. The method of claim 13, wherein the egress node is a primary node to transmit the data packets out of the cluster of nodes.

17. The method of claim 13, wherein the method further comprises:

determining that routing of the data packets from the source to the target requires transmission through a first cluster of nodes and a second cluster of nodes;

deploying a first quantum optimization engine on the first cluster of nodes and a second quantum optimization engine on the second cluster of nodes, wherein the first cluster of nodes is associated with a first ingress node and a first egress node, wherein the second cluster of nodes is associated with a second ingress node and a second egress node;

determining, using the first quantum optimization engine, a first optimal data path from the first ingress node to the first egress node of the first cluster of nodes;

determining, using the second quantum optimization engine, a second optimal data path from the second ingress node to the second egress node of the second cluster of nodes; and transmitting controls signals configured to route the data packets from the source, via the first optimal path and the second optimal path, to the target.

* * * * *